H. WYMAN.
PHOTOGRAPH DEVELOPING CASE.
APPLICATION FILED DEC. 9, 1912.
1,101,229.
Patented June 23, 1914.
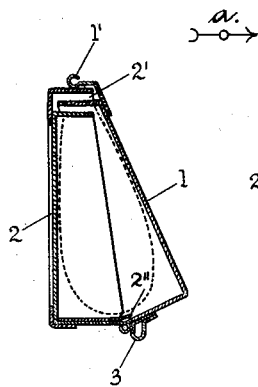
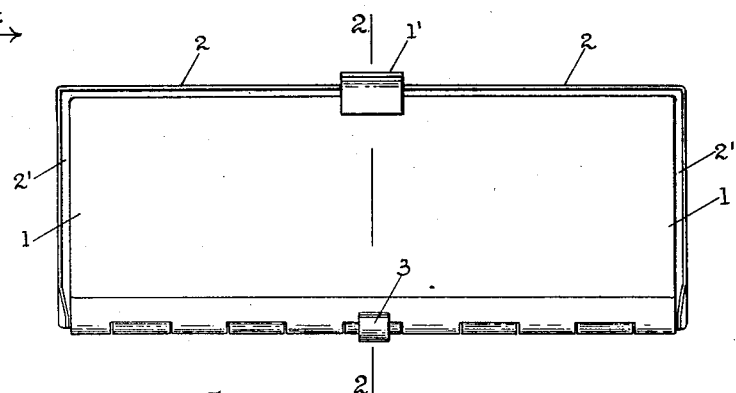
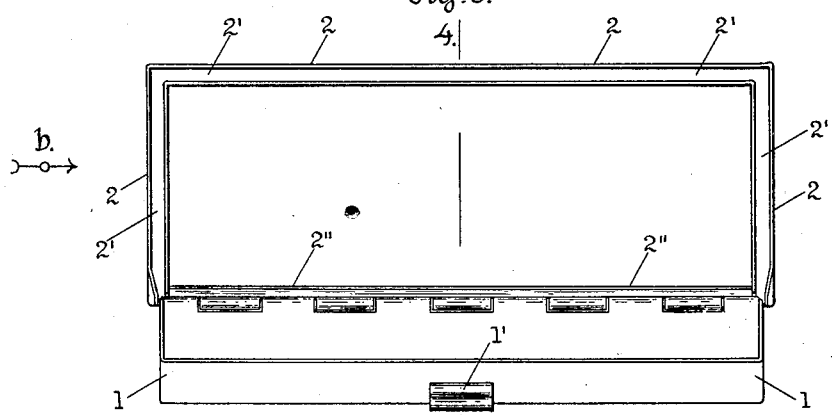
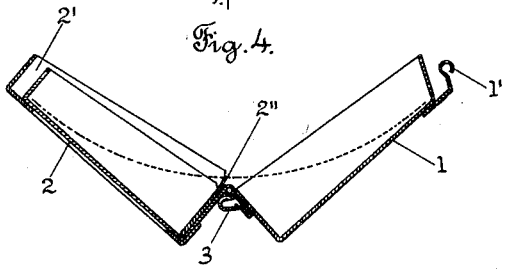
Witnesses
M. Bredt.
M. Haas.
Inventor
Horace Wyman.
By John C. Dewey,
Attorney.

UNITED STATES PATENT OFFICE.

HORACE WYMAN, OF WORCESTER, MASSACHUSETTS.

PHOTOGRAPH-DEVELOPING CASE.

1,101,229.  Specification of Letters Patent.  Patented June 23, 1914.

Application filed December 9, 1912. Serial No. 735,587.

*To all whom it may concern:*

Be it known that I, HORACE WYMAN, a citizen of the United States, residing at Worcester, in the county of Worcester and State of Massachusetts, have invented certain new and useful Improvements in Photograph-Developing Cases, of which the following is a specification.

My invention relates to a photograph film developing case, and the object of my invention is to provide a light excluding case, to receive a flat flexible sensitized film, to be developed.

My invention consists in my improved construction of a film case or holder for developing photographic films, which, after exposure and transfer from a film pack into the case in the dark, can be brought into daylight, and developed in the usual way, as will be hereinafter fully described.

Referring to the drawing:—Figure 1 is a plan view of a film case embodying my improvements. Fig. 2 is a section, on line 2, 2, Fig. 1, looking in the direction of arrow *a*, same figure; the broken lines indicate a film within the case. Fig. 3 shows the case shown in Fig. 1 open. Fig. 4 is a section, on line 4, 4, Fig. 3, looking in the direction of arrow *b*, same figure; the broken lines indicate a film within the case.

In the accompanying drawing, the film holding case consists of two parts 1, and 2, preferably made of metal, and preferably of wedge shape in cross section, as shown in Fig. 2. The two parts 1 and 2 are hinged together in the middle on the wider edges thereof, in the direction of the length of the case. A stop 3, on the rear edge of one or both of the parts, as 1, limits the moving apart of the two parts 1 and 2 of the case, as shown in Fig. 4. The parts 1 and 2 of the case have their edges on the front side, and on the ends, turned up to retain the film in position. When the film is being placed in the case, the edges thereof will contact with the upturned sides of the case, and the displacement of the film will be prevented. The part 1 has in this instance a lip or extension 1' thereon, on the free edge thereof, to be engaged by the user, to open and close the case. The part 2 of the case has preferably a double front side and ends, as shown in Fig. 3, forming a recess 2', into which the front side and ends of the other part 1 enter, when the case is closed, as shown in Fig. 2. The inner edge of the part 2 extends above the hinge joint, as shown at 2", Figs. 2 and 4, to shut out the light. By means of the double front side and ends on the part 2, forming the inclosed trough 2', into which the front side and ends of the part 1 enter, as shown in Fig. 2, the light is excluded from the case when it is closed, and at the same time a free passage is left for the flow of the film developer.

When the case is open, a film is placed therein, as shown by broken lines in Fig. 4, and one of the edges of the film bears against the outer sides of the part 1 of the case and the opposite edge of the film bears against the outer edge of the part 2 of the case, and the film is retained in the case, preparatory to closing the case. When the case is closed, the film will be bent to occupy the curved position shown by broken lines in Fig. 2, and the light will be excluded from the case, but the joints in the case will permit the developer to flow freely between the two parts 1 and 2, and into the open space over the sensitized surface of the film, to develop the same.

My film case is preferably made wedge shape in cross section, that is of greater thickness at its rear edge, and inclined toward its front edge, and is hinged longitudinally in the middle of the back, to receive, when open, the full width of a film, which doubles up when the case is closed to half its width, as shown in Fig. 2, and consequently economizes the space occupied.

By having the case hinged longitudinally in the middle of its rear edge, the upturned ends of both parts will be nearly uniform, and raised above the parts to prevent the displacement of the film endwise when closing the case.

It will be understood that the details of construction of my improvements may be varied if desired.

The principal object of my invention is to provide a photograph film developing case, which is so constructed that the light will be excluded therefrom, but there will be passages for the film developer to enter the inside of the case, to develop the film inclosed in the case in a curved or doubled up position, having its opposite edges nearly meeting, with the sensitized surface protected on the inside, and the usual opaque paper backing on the outside, next to the case, which will not be affected by the slight amount of light entering the case.

Having thus described my invention, what I claim as new and desire to secure by Letters Patent is:—

1. A photograph film developing case of wedge shape in cross section, consisting of two parts hinged longitudinally on one edge, and one part having a double side and ends, forming a recess to receive the side and ends of the other part, and limited as to the moving apart, or opening of the two parts, by stops on their rear edges.

2. A photograph film developing case, comprising two parts, hinged in the direction of their length on one edge, and one part having the front and rear side, and the ends, extending at substantially right angles to the body of said part, and the other part having the rear side extending at substantially right angles to the body of said part, and having a double front side, and double ends, extending at substantially right angles to the body of said part, and forming a recess to receive the front side and ends of the other part, and the inner edge of said part with the double ends, extended at the hinge joint, above said joint.

3. A photograph film developing case, to receive a sensitized film, consisting of two hinged parts with upturned sides and ends, to position the film, and one part having a double front side and ends, forming a recess to receive the front side and ends of the other part, to exclude the light, but allow the passage of the film developer into the said case.

4. A film developing case having means to exclude the light from a sensitized film placed therein, and consisting of two parts hinged together, and adapted to open and receive the film and to close upon said film, and having retaining means to position the film, one part to contact with one edge of the film, and the other part to contact with the opposite edge of the film, and bend the film into curved shape when the case is closed, and having openings, formed to exclude the light but allow the passage of the film developer into said case.

5. A photograph film developing case to receive a sensitized film, consisting of two hinged parts with upturned sides and ends, to position the film, and having stops on the rear of the sides, to limit the opening of the case, and one part having a double front side and ends, forming a recess to receive the front side and ends of the other part, to exclude the light, but allow the passage of the film developer into said case.

6. A photograph developing case, consisting of two parts hinged together in the middle of the back thereof, whereby, when open, the upturned edges of the ends of the two parts will have practically the same retaining height to position a film when placed therein, and having light excluding passages adapted to allow the flow of the film developer into said case when closed.

7. A photograph film developing case, consisting of two hinged parts, with upturned edges, adapted when open to receive a film therein, one edge of the film contacting with the upturned edge of one part, and its opposite edge contacting with the upturned edge of the other part, and adapted, when closed, to bend the film into a curved or double position and having light excluding passages for the film developer to enter into said case when closed.

8. A photograph film developing case, consisting of two parts hinged together longitudinally in the middle of its back, each part having upturned edges on their sides and ends, to position a film therein, said parts having a recess between two edges, and a projecting edge entering into the recess, forming a light excluding passage into the case for the developer to flow into the inside of the case.

9. A photograph film developing case for a sensitized film, consisting of two hinged parts with upturned edges and ends, and having a passage into the case for the developer, formed by a recess between two edges on one part, and one edge on the other part projecting into the recess, to exclude the light from passing into the case.

HORACE WYMAN.

Witnesses:
MINNA HAAS,
JOHN C. DEWEY.

---

Copies of this patent may be obtained for five cents each, by addressing the "Commissioner of Patents, Washington, D. C."